2,959,573
ACCELERATING VULCANIZATION WITH -YLIDENE THIAZOLESULFENAMIDES

John J. D'Amico, Nitro, W. Va., assignor to Monsanto Chemical Company, St. Louis, Mo., a corporation of Delaware No Drawing. Filed Jan. 16, 1958, Ser. No. 709,202

9 Claims. (Cl. 260—79.5)

The present invention relates to a process of accelerating vulcanization of rubber. More particularly, it relates to accelerating vulcanization with -ylidene thiazolesulfenamides.

It is an object of the present invention to accelerate the vulcanization of sulfur vulcanizable diene rubber whether natural or synthetic. A further object is to provide vulcanizable natural and synthetic rubber compositions which possess a high degree of processing safety. Still another object is to provide vulcanized natural and synthetic rubber compositions which possess desirable physical properties. Other objects will be apparent from the detailed description following.

It has been found that the objects of the invention may be achieved employing as the essential accelerating component a compound conforming to the structure

T—S—N=R where T represents an arylene thiazole radical which radical may contain substituents in the arylene nucleus, as for example lower alkyl, halogen, preferably chlorine or bromine, nitro, and lower alkoxy substituents. R represents a divalent non-aromatic -ylidene radical in which the carbon attached to the nitrogen is linked to two different carbon atoms. The -ylidene radicals may be regarded as derived from the parent hydrocarbon by replacing two hydrogen atoms from either a primary or secondary carbon atom and the radicals contemplated here are those in which hydrogen on a secondary carbon atom has been replaced. They may be designated secondary -ylidene radicals to indicate the absence of hydrogen on the carbon attached to the nitrogen. More particularly, the accelerators may be represented schematically by the structure

where T has the same meaning as before, R represents a lower alkyl group and R' represents lower alkyl or alkenyl, as for example methyl, ethyl, propyl, isopropyl, butyl, amyl, vinyl and allyl or R and R' together complete an alicyclic ring.

Accelerators which may be cited to illustrate the invention comprise the following, although the invention is by no means limited thereto:

N-isopropylidene-2-benzothiazolesulfenamide
N-isopropylidene-2-(5-chlorobenzothiazole)sulfenamide
N-isopropylidene-2-(4-methylbenzothiazole)sulfenamide
N-isopropylidene-2-(6-ethoxybenzothiazole)sulfenamide
N-isopropylidene-2-(4-phenylbenzothiazole)sulfenamide
N-isopropylidene-2-(6-nitrobenzothiazole)sulfenamide
N-cyclohexylidene-2-benzothiazolesulfenamide
N-cyclopentylidene-2-benzothiazolesulfenamide
N-(2-butylidene)-2-benzothiazolesulfenamide Preparation of the accelerators, some of which are new compounds, is illustrated below:

N-isopropylidene-2-benzothiazolesulfenamide was prepared by refluxing one mole of 2-benzothiazolesulfenamide and ten moles of acetone in ethyl alcohol containing a little sodium hydroxide. However, a better yield was obtained by heating for 15 minutes at 60–70° C. a charge consisting of 100 grams (0.548 mole) of 2-benzothiazolesulfenamide, 58 grams (1.0 mole) of acetone and 150 ml. of ethyl alcohol containing 30 ml. of 2 N sodium hydroxide. The reaction mixture was cooled to 5° C., filtered and the solid air dried. The product, obtained in 89.1% yield, melted at 129–131° C. It was insoluble in water and heptane, slightly soluble in ether, acetone, benzene, alcohol and ethyl acetate and soluble in chloroform.

A charge consisting of 50 grams (0.274 mole) of 2-benzothiazolesulfenamide, 49.1 grams (0.5 mole) of cyclohexanone and 50 ml. of ethyl alcohol containing 15 ml. of 2 N sodium hydroxide was heated at 82° C. for one hour. The reaction mixture was then cooled to 5° C. and the precipitate which had started to form at 40° C. was removed by filtration, washed with heptane and air dried. A 79.4% yield of N-cyclohexylidene-2-benzothiazolesulfenamide was obtained, M.P. 106–107° C. after recrystallizing from ethyl alcohol. Analysis gave 10.8% nitrogen and 24.4% sulfur as compared to 10.7% nitrogen and 24.4% sulfur calculated for $C_{13}H_{14}N_2S_2$.

The most satisfactory procedure for preparation of N-cyclopentylidene-2-benzothiazolesulfenamide was to heat a charge consisting of 100 grams (0.548 mole) of 2-benzothiazolesulfenamide, 84.1 grams (1.0 mole) of cyclopentanone and 100 ml. of ethyl alcohol containing 30 ml. of 2 N sodium hydroxide at 60–77° C. for one-half hour. The product was removed by filtration after cooling the reaction mixture to 5° C. and washed with 100 ml. of ethyl alcohol. The yield was 87.3%. The product had a melting point of 131–132° C. when recrystallized from ethyl alcohol.

It was found that the accelerators may be reduced to the saturated sulfenamide. For example, reaction of N-isopropylidene-2-benzothiazolesulfenamide with sodium boronhydride gave an 87% yield of N-isopropyl-2-benzothiazolesulfenamide, M.P. 94–95° C. The product contained 12.3% nitrogen and 28.6% sulfur as compared to the calculated 12.5% nitrogen and 28.6% sulfur. The melting point was not depressed with an admixture of an authentic sample of N-isopropyl-2-benzothiazolesulfenamide.

The valuable properties of the new accelerators may be demonstrated by heating them with the rubber and sulfur in the manner well known to the art. Vulcanizable compositions were compounded comprising:

|  | Parts by weight |
|---|---|
| Smoked sheets | 100.0 |
| Carbon black | 50.0 |
| Zinc oxide | 5.0 |
| Stearic acid | 3.0 |
| Saturated hydrocarbon softener | 3.0 |
| 1,2-Dihydro-6-dodecyl-2,2,4-trimethylquinoline | 1.5 |
| Sulfur | 2.5 |
| Accelerator | 0.5 |

Processing safety of the vulcanizable mixes was evaluated by means of a Mooney plastometer. The figures recorded were the times required for the Mooney plasticity at 135° C. to rise ten points above the minimum value.

| Stock | Accelerator | Mooney Scorch Time at 135° C., Time in minutes for 10 pt. rise above minimum |
|---|---|---|
| A | N-Isopropylidene-2-benzothiazole-sulfenamide. | 10.4 |
| B | N-Cyclohexylidene-2-benzothiazole-sulfenamide. | 8.9 |
| C | N-Cyclopentylidene-2-benzothiazole-sulfenamide. | 9.0 |
| D | 2,2'-Dithiobisbenzothiazole (control) | 7.2 |

The compositions were vulcanized by heating for different periods of time in the usual manner in a press at 144° C. The modulus and tensile properties of the 30 minute cures are recorded below:

| Stock | Modulus of Elasticity in lbs./in.² at Elongation of 300% | Tensile at Break in, lbs./in.² | Ultimate Elongation, Percent |
|---|---|---|---|
| A | 1,900 | 3,840 | 530 |
| B | 2,010 | 3,850 | 500 |
| C | 2,000 | 3,940 | 500 |
| D | 1,930 | 3,800 | 510 |

The accelerating properties and processing safety in the following stock further illustrate the invention:

Parts by weight
Smoked sheets ------------------------------- 100.0
Carbon black -------------------------------- 50.0
Zinc oxide ---------------------------------- 5.0
Stearic acid -------------------------------- 3.0
Saturated hydrocarbon softener -------------- 3.0
1,2-Dihydro-6-dodecyl-2,2,4-trimethylquinoline --- 1.5
N-Nitrosodiphenylamine ---------------------- 1.0
Sulfur -------------------------------------- 2.5
Accelerator --------------------------------- 0.5

Employing as a control N-cyclohexyl-2-benzothiazole-sulfenamide, processing safety determined as described above gave results as follows:

| Stock | Accelerator | Mooney Scorch Time at 135° C., Time in minutes for 10 pt. rise above minimum |
|---|---|---|
| E | N-Cyclohexylidene-2-benzothiazole-sulfenamide. | 14.5 |
| F | N-Isopropylidene-2-benzothiazole-sulfenamide. | 17.5 |
| G | N-Cyclohexyl-2-benzothiazolesulfenamide. | 14.0 |

The compositions were vulcanized by heating for different periods of time in the usual manner in a press at 144° C. The modulus and tensile properties of the 30 minute cures are recorded below:

| Stock | Modulus of Elasticity in lbs./in.² at Elongation of 300% | Tensile at Break in, lbs./in.² | Ultimate Elongation, Percent |
|---|---|---|---|
| E | 1,870 | 3,840 | 540 |
| F | 2,030 | 3,780 | 530 |
| G | 2,050 | 3,940 | 520 |

While the invention has been illustrated by use of elemental sulfur as the vulcanizing agent, other vulcanizing systems are applicable. Various N,N'-thioamines are known to be vulcanizing agents, as for example N,N'-dithiobis morpholine, and may be used in the practice of the invention. In general, any sulfur vulcanizing agent is suitable whether in the form of elemental sulfur or selenium or in the form of a sulfur compound which releases sulfur at vulcanizing temperature. The sulfur level can be varied to achieve particular objectives. The accelerators may be used alone or in admixture with other accelerators, as for example diphenyl guanidine, usually in amounts within the range of 0.1–5.0%.

Other sulfur vulcanizable diene rubbers can be used in the practice of the invention. These include styrene-butadiene copolymer rubbers, polybutadiene, isobutylene polymerized in the presence of a small amount of a diene hydrocarbon (Butyl rubber) and the like.

It is intended to cover all changes and modifications of the examples of the invention herein chosen for purposes of disclosure which do not constitute departures from the spirit and scope of the invention.

What is claimed is:

1. The process of vulcanizing a sulfur vulcanizable diene rubber which comprises heating the rubber and sulfur in the presence of a small amount sufficient to accelerate vulcanization of a compound of the structure

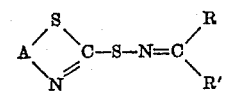

where A represents a radical selected from the group consisting of unsubstituted phenylene, hydrocarbon substituted phenylene containing less than thirteen carbon atoms, halogen substituted phenylene, lower alkoxy substituted phenylene and nitro substituted phenylene, R represents lower alkyl and R' is selected from the group consisting of lower alkyl, lower alkenyl and groups which with R form cycloalkylidene containing at least 5 but not more than 6 ring carbon atoms.

2. The process of vulcanizing a sulfur vulcanizable diene rubber which comprises heating the rubber and sulfur in the presence of a small amount sufficient to accelerate vulcanization of a compound of the structure

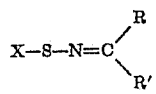

where T represents 2-benzothiazolyl, R represents lower alkyl and R' represents lower alkenyl.

3. The process of vulcanizing a sulfur vulcanizable diene rubber which comprises heating the rubber and sulfur in the presence of a small amount sufficient to accelerate vulcanization of a compound of the structure

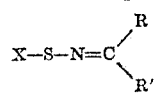

where T represents 2-benzothiazolyl and R and R' represent lower alkyl groups.

4. The process of vulcanizing a sulfur vulcanizable diene rubber which comprises heating the rubber and sulfur in the presence of a small amount sufficient to accelerate vulcanization of a compound of the structure T—S—N=R where T represents 2-benzothiazolyl and R represents a cycloalkylidene radical derived by removal of two hydrogen atoms from a single carbon of a saturated ring hydrocarbon containing at least five but not more than six ring carbon atoms.

5. The process of vulcanizing a sulfur vulcanizable diene rubber which comprises heating the rubber and sulfur in the presence of a small amount sufficient to accelerate vulcanization of N-isopropylidene-2-benzothiazolesulfenamide.

6. The process of vulcanizing a sulfur vulcanizable diene rubber which comprises heating the rubber and sulfur in the presence of a small amount sufficient to accelerate vulcanization of N-cyclohexylidene-2-benzothiazolesulfenamide.

7. The process of vulcanizing a sulfur vulcanizable diene rubber which comprises heating the rubber and sulfur in the presence of a small amount sufficient to accelerate vulcanization of N-cyclopentylidene-2-benzothiazolesulfenamide.

8. The vulcanized product produced by the process of claim 1.

9. The vulcanized product produced by the process of claim 5.

References Cited in the file of this patent

UNITED STATES PATENTS

| | | |
|---|---|---|
| 2,470,555 | Harmon | May 17, 1949 |
| 2,560,045 | Smith | July 10, 1951 |